May 6, 1952      J. F. SANDERS      2,595,302
ANIMAL RESTRAINING DEVICE
Filed July 7, 1950
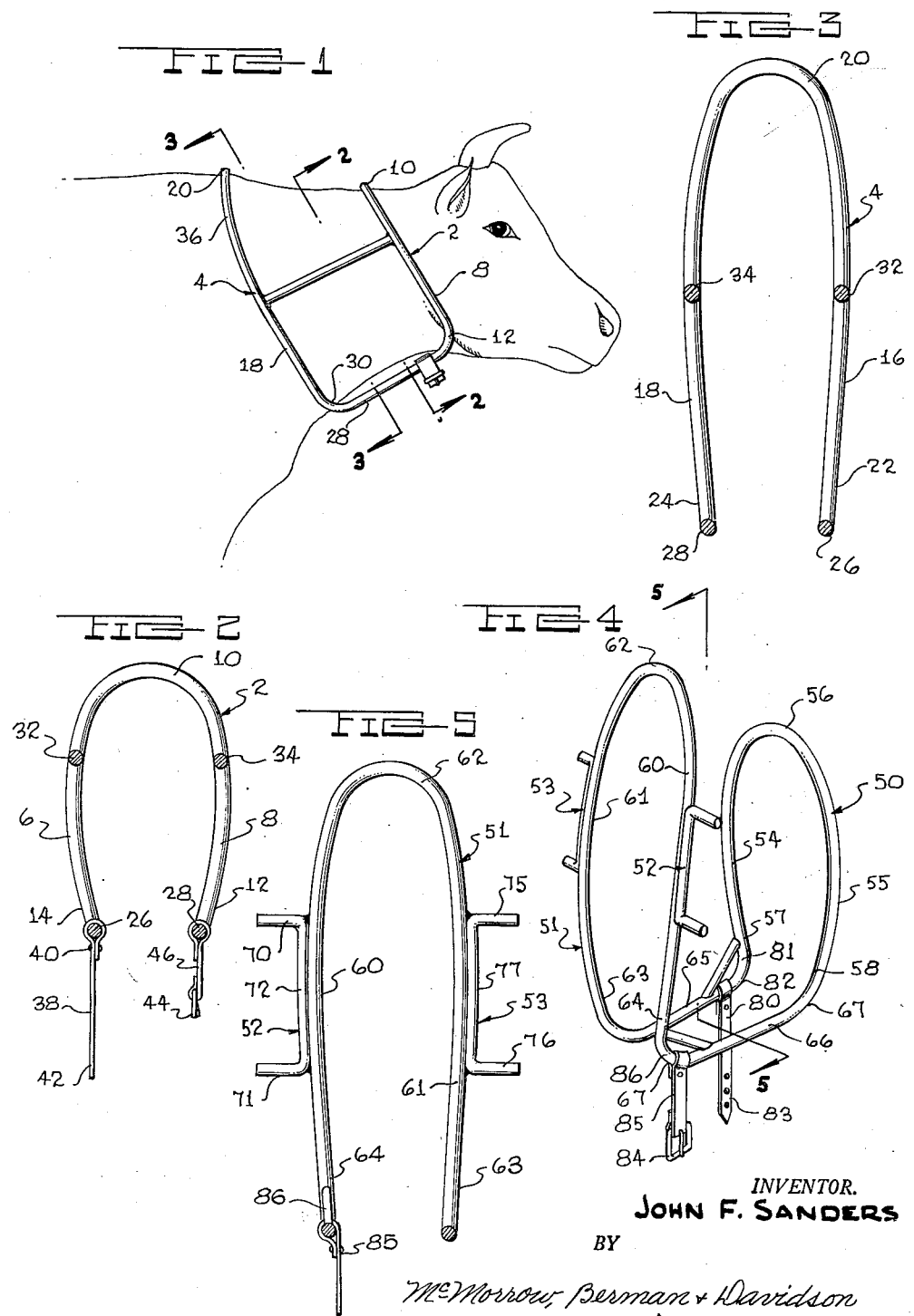
INVENTOR.
JOHN F. SANDERS
BY
McMorrow, Berman & Davidson
ATTORNEYS Patented May 6, 1952

2,595,302

UNITED STATES PATENT OFFICE 2,595,302

ANIMAL RESTRAINING DEVICE

John F. Sanders, Jonesboro, N. C.

Application July 7, 1950, Serial No. 172,551

4 Claims. (Cl. 119—96)

This application is a continuation in part of my application Serial No. 682,376, filed July 9, 1946, now abandoned, and has to do with an invention relating to an animal restraining device, and more particularly to such device for restraining cows from turning their heads too far, thus preventing them from nursing themselves.

An object of the invention is to provide a device which can be placed about the neck of a cow so as to prevent it from turning its head more than a desired amount.

Another object of the invention is to provide a device which can be employed to prevent a cow from nursing itself and which is not in the least harmful to the cow itself.

A further object of the invention is to provide a device for the purposes aforesaid, and which is simple in design, inexpensive to manufacture, and effective in operation.

Further objects and advantages of the invention will become apparent from the following description of a preferred embodiment thereof as illustrated in the accompanying drawings and in which, Figure 1 is a side elevation of a device according to the present invention showing it in position upon a cow.

Figure 2 is a sectional view, on an enlarged scale, taken on line 2—2 of Figure 1.

Figure 3 is a sectional view, on an enlarged scale, taken on line 3—3 of Figure 1.

Figure 4 is a perspective view of another form of the device of the present invention.

Figure 5 is a sectional view, on an enlarged scale, taken along the line 5—5 of Figure 4.

Reference is now had to Figures 1 to 3 of the drawings in which like reference characters denote similar parts throughout the several views. As seen in Figure 1, there is a cow with the device in position for restraining the cow from making a U turn with her neck, and the device does not otherwise hamper the movements of the cow's head, and is hence quite humane.

The device includes a front yoke 2 and a rear yoke 4, each yoke being substantially inverted and U-shaped in end view as shown in Figures 2 and 3. The forward yoke 2 has left and right side members 6 and 8 connected at the top by a bridging member 10, the side members converging toward their lower ends 12 and 14 to substantially embrace the animal's neck rearward of its ears, and extending downward to the animal's jaw.

The rear yoke 4 is longer than the front yoke 2 and has left and right side members 16 and 18 which are connected at the top by a bridging member 20, the side members converging toward their lower ends 22 and 24 to substantially embrace the animal's neck just forward of its shoulders, and extending downward to the lower edge of the animal's neck. Left and right longitudinal bottom side rails 26 and 28 extend longitudinally of the device to connect at their forward and rearward ends with the lower ends of the side members on each side of the cow's neck, thus connecting side members 8 and 18, and also side members 6 and 16, the corners as at 30 being rounded to avoid injury to the cow.

Upper left and right side rails 32 and 34 which are parallel to lower side rails 26 and 28, extend longitudinally of the device as shown, and are smoothly connected at their ends by welding or otherwise, to the side members 8 and 18, and also 6 and 16. It will also be noted that the shape of the connection between the bridging members 10 and 20 and their respective side members is well rounded to conform to the contour of the cow, and thus make for maximum comfort, and in fact, it is preferable to form the yokes out of a single piece of galvanized steel and it is also a relatively simple matter to form the entire device out of a single piece of eighth inch galvanized steel pipe which is bent to form the yokes and their connecting lower side rails and welded at the single joint, the upper side rails being welded into place.

It will be observed that the lower side rails extend along toward the rearward yoke 4, just below the cow's throat, and the upper portion of the rearward yoke is rounded or curved as at 36 to comfortably fit the cow, and to seat forward of its shoulders.

A single leather strap 38 is looped around the lower left side rail 26 at one end 40, being adapted to engage at its other end 42 with a buckle 44 secured at one end of a second leather strap 46 the other end of which is looped around the other side rail 28 as seen in Fig. 2. This strap is thus the means for holding the device in place on the cow's neck.

The form shown in Figures 4 and 5 likewise includes a front yoke 50 and a rear yoke 51, each yoke being substantially inverted and U-shaped as shown in Figure 4, and with the rear yoke 51 being longer than the front yoke 50, and differs over the device of Figures 1 to 3 inclusive in that the pair of longitudinally extending side rails 32 and 34 extending between the front yoke 2 and rear yoke 4 intermediate the top bridging members 10 and 20 in the latter named device are omitted, and each of the side members of the rear yoke 51 is provided with a prong element 52 and 53.

The front yoke 50 has left and right side members 54 and 55 connected at the top by a bridging member 56, the side members converging toward their lower ends 57 and 58 to substantially embrace the animal's neck portion rearward of its ears and extending downward to the animal's jaw.

The yoke 51 has left and right side members 60 and 61 connected at the top by a bridging member 62, the side members converging toward their lower ends 63 and 64 to substantially embrace the animal's neck portion just forward of its shoulders and extending downward to the lower edge of the animal's neck. Left and right longitudinal bottom side rails 65 and 66 extend longitudinally of the yokes 50 and 51 to connect at their forward and rearward ends with the lower ends of the side members on each side of the animal's neck, thus connecting side members 60 and 54 and side members 61 and 55, the corners as at 67 being rounded to avoid injury to the cow.

The prong element 52 on the side member 60 of the rear yoke 51 embodies a pair of spaced prongs 70 and 71 positioned intermediate the ends of the side member 60 and projecting therefrom. As shown in Figures 4 and 5, the prong element 52 comprises a U-shaped wire in which the prongs or legs 70 and 71 face away from the side member 60 and the bight 72 is fixedly secured to the latter member.

The prong element 53 on the side member 61 of the rear yoke 51 likewise embodies a pair of spaced prongs 75 and 76 positioned intermediate the ends of the side member 61 and projecting therefrom. As shown in Figures 4 and 5, the prong element 53 comprises a U-shaped wire in which the prongs or legs 75 and 76 face away from the side member 61 and the bight 77 is fixedly secured to the latter member.

A single leather strap 80 is looped through an eye 81 formed at the juncture point of the lower end 57 of the front yoke 50 and the side rail 65 at one end 82 and having its other end 83 adapted to engage with a buckle 84 secured to one end of another leather strap 85, the leather strap 85 having its other end looped through an eye 86 formed at the juncture point of the lower end 64 of the rear yoke 51 and the side rail 66. These straps constitute the means for holding the device in place on the cow's neck.

I claim:

1. A restraining device to prevent an animal from turning its head comprising a forward substantially rigid relatively short inverted U-shaped yoke engaging over the neck of the animal adjacent to the rear side of the animal's head, said forward yoke being arranged at an inclination to the vertical and having the bottom ends of its sides terminating above the lower side of the neck of the animal, a rear substantially rigid relatively long inverted U-shaped yoke engaging over the top of the neck of the animal and spaced longitudinally rearwardly of the forward yoke, said rear yoke being arranged at an inclination to the vertical and extending parallel to said forward yoke, the bottom ends of the sides of the rear yoke terminating adjacent to the bottom of the neck of the animal, a pair of longitudinally extending side rails disposed adjacent to the bottom of the neck of the animal and extending between the forward and rear yokes and secured to the bottoms of the sides of the forward and rear yokes, the junctions of the side rails and yokes forming forward and rear bottom rounded corners, and detachable fastening means connected with said side rails and engaging beneath the bottom of the neck of the animal for detachably securing the device to the animal.

2. A restraining device to prevent an animal from turning its head comprising a forward substantially rigid relatively short inverted U-shaped yoke engaging over the neck of the animal adjacent to the rear side of the animal's head, said forward yoke being arranged at an inclination to the vertical and having the bottom ends of its sides terminating above the lower side of the neck of the animal, a rear substantially rigid relatively long inverted U-shaped yoke engaging over the top of the neck of the animal and spaced longitudinally rearwardly of the forward yoke, said rear yoke being arranged at an inclination to the vertical and extending parallel to said forward yoke, the bottom ends of the sides of the rear yoke terminating adjacent to the bottom of the neck of the animal, a pair of longitudinally extending side rails disposed adjacent to the bottom of the neck of the animal and extending between the forward and rear yokes and secured to the bottoms of the sides of the forward and rear yokes, the junctions of the side rails and yokes forming forward and rear bottom rounded corners, a prong element on each of the sides of said rear yokes intermediate their ends and projecting therefrom and detachable fastening means connected with said side rails and engaging beneath the bottom of the neck of the animal for detachably securing the device to the animal.

3. A restraining device to prevent an animal from turning its head comprising a forward substantially rigid relatively short inverted U-shaped yoke engaging over the neck of the animal adjacent to the rear side of the animal's head, said forward yoke being arranged at an inclination to the vertical and having the bottom ends of its sides terminating above the lower side of the neck of the animal, a rear substantially rigid relatively long inverted U-shaped yoke engaging over the top of the neck of the animal and spaced longitudinally rearwardly of the forward yoke, said rear yoke being arranged at an inclination to the vertical and extending parallel to said forward yoke, the bottom ends of the sides of the rear yoke terminating adjacent to the bottom of the neck of the animal, a pair of longitudinally extending side rails disposed adjacent to the bottom of the neck of the animal and extending between the forward and rear yokes and secured to the bottoms of the sides of the forward and rear yokes, the junctions of the side rails and yokes forming forward and rear bottom rounded corners, a pair of spaced prongs on each of the sides of said rear yoke intermediate their ends and projecting therefrom, and detachable strap means carried by said side rails and engaging beneath the bottom of the neck of the animal for detachably securing the device to the animal.

4. A restraining device to prevent an animal from turning its head comprising a forward substantially rigid relatively short inverted U-shaped yoke engaging over the neck of the animal adjacent to the rear side of the animal's head, said forward yoke being arranged at an inclination to the vertical and having the bottom ends of its sides terminating above the lower side of the neck of the animal, a rear substantially rigid relatively long inverted U-shaped yoke engaging over the top of the neck of the animal and spaced longitudinally rearwardly of the forward yoke, said rear yoke being arranged at an inclination to the vertical and extending parallel to said forward yoke, the bottom ends of the sides of the rear yoke terminating adjacent to the bottom of the neck of the animal, a pair of bottom longitudinally extending side rails disposed adjacent to the bottom of the neck of the animal and extending between the forward and rear yokes and secured to the bottoms of the sides of the forward and rear yokes, the junctions of the side rails and yokes forming forward and rear bottom rounded corners, a pair of upper longitudinally extending side rails arranged near and below the top of the neck of the animal and extending between the forward and rear yokes and having their forward and rear ends secured to the sides of the yoke and extending parallel to the bottom side rails, and detachable fastening means connected with the bottom side rails and engaging beneath the bottom of the neck of the animal for detachably securing the device to the animal.

JOHN F. SANDERS.

REFERENCES CITED

The following references are of record in the file of this patent:

UNITED STATES PATENTS

| Number | Name | Date |
| --- | --- | --- |
| 779,927 | Griffith | Jan. 10, 1905 |